Figure 1:
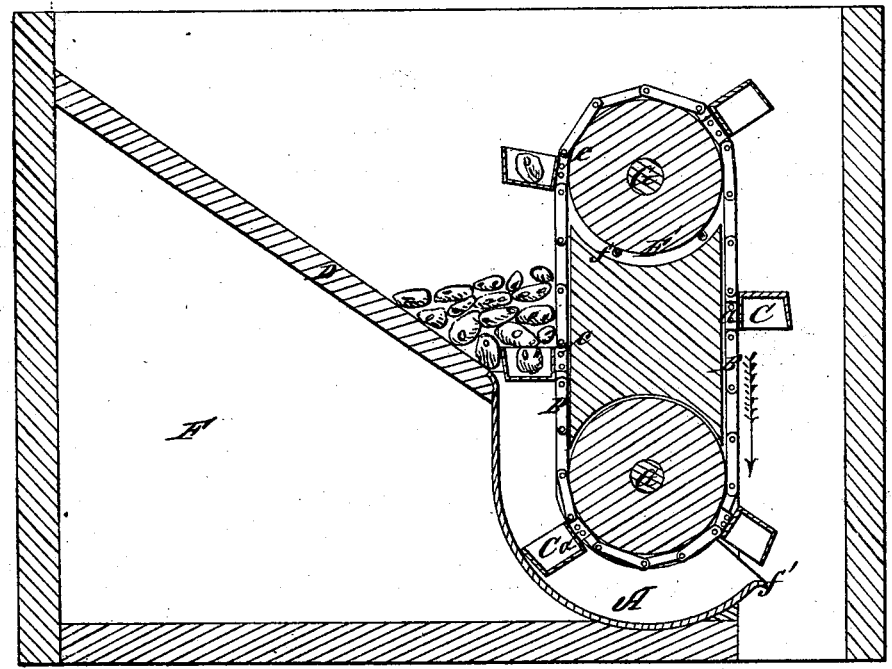

N. B. SHERWOOD.
POTATO PLANTER.

No. 84,309. Patented Nov. 24, 1868.

Witnesses:

Inventor:
N. B. Sherwood
By Loughborough
Atty

NORMAN B. SHERWOOD, OF MILLVILLE, NEW YORK.

Letters Patent No. 84,309, dated November 24, 1868.

IMPROVEMENT IN POTATO-PLANTERS.

The Schedule referred to in these Letters Patent and making part of the same.

*To all whom it may concern:*

Be it known that I, NORMAN B. SHERWOOD, of Millville, in the State of New York, have invented a new and useful Potato-Planter; and I do hereby declare that the following is a full, clear, and exact description thereof, reference being had to the accompanying drawing, making part of this specification, in which—

Figure 1 is a vertical longitudinal section.

The nature of my invention will be understood from the drawings and specifications.

To enable others skilled in the art to make and use my invention, I will describe its construction and operation.

I make a box, F, of any desirable shape, in which an elevator is placed. The elevator consists of an iron chain, B, to which the cups C are fastened by a shank, $a$, at equal distance apart. The cups C are made flaring at the top, so that the potatoes will discharge freely. The shank $a$ is inserted in the links, and a rivet is put through, as shown at $c$ in the drawings.

By fastening the cups C to the chain B in this manner, they are held firmly, and not allowed to move laterally. They may be fastened otherwise, but I prefer this mode.

The upper pulley, F', has forked irons, $f$, inserted in its periphery, in which the chain runs, and they prevent it from slipping. The space on each side, between the chain and the side of the box, is enclosed, so that the chain B runs in a groove its entire length, which causes it to run evenly.

The elevator is carried by the pulleys F', which are driven by a belt, running to either of the shafts G from a pulley on the axle of the machine carrying this device. At the bottom a tube, A, is placed, which is made circular in form, as shown in the drawings, and is of sufficient length to allow two of the cups C to be in at the same time, or (as shown in the drawings) to allow one cup C to enter while one is passing out, and one to be entirely in. This arrangement of the tube A prevents the potatoes from dropping through after the cup C has passed the top of the tube A, as the next cup will catch the potatoes as they fall into the tube.

If the tube were not long enough to allow one of the cups C to be in it after one has passed out, the potatoes would pass through, and not be delivered where required. The mouth of this tube is made flaring, as shown at $f$, so that the cups will enter easily.

The hopper D is formed by placing a false bottom to the box, which extends from the top of the tube A to the rear of the box F, and also to the sides, at any angle that will cause the potatoes to pass into the tube by their gravity.

The operation of this device is as follows: The potatoes are placed in the hopper D, and the elevator set in motion. The potatoes are carried up by the cup C, and as they pass over the centre of the upper pulley F', they are delivered into an ordinary distributing-cultivator tooth, shown in the drawing, at the bottom of the planter. The cups being placed at regular distances apart, the potatoes are deposited on the ground at regular intervals, and covered by any suitable device.

What I claim as my invention, and desire to secure by Letters Patent, is—

1. The tube A, in combination with the carrying-chain B, or its equivalent, and elevating-cups C, or their equivalent, arranged substantially as and for the purpose set forth.

2. In combination with the above, the hopper D, constructed and operating as herein shown, and for the purpose described.

N. B. SHERWOOD.

Witnesses:
JAS. L. GAGE,
WM. S. LOUGHBOROUGH.